I. LEVY.
GARBAGE CAN.
APPLICATION FILED MAY 17, 1921.

1,401,090.

Patented Dec. 20, 1921.

WITNESSES

INVENTOR
Isidor Levy.
BY
ATTORNEYS

UNITED STATES PATENT OFFICE.

ISIDOR LEVY, OF NEW YORK, N. Y.

GARBAGE-CAN.

1,401,090.　　　　Specification of Letters Patent.　　Patented Dec. 20, 1921.

Application filed May 17, 1921.　Serial No. 470,259.

*To all whom it may concern:*

Be it known that I, ISIDOR LEVY, a citizen of the United States, and a resident of the city of New York, borough of Manhattan, in the county of New York and State of New York, have invented a new and Improved Garbage-Can, of which the following is a full, clear, and exact description.

The present invention relates to new and useful improvements in metallic receptacles and it pertains more particularly to garbage receptacles adapted for household use.

It is one of the objects of the invention to construct a garbage receptacle in which there is an inner and an outer receptacle movably arranged together in such a manner that the inner receptacle may be readily removable with respect to the outer receptacle.

It is a further object of the invention to so construct portions of the inner receptacle that they will have interengagement with the outer receptacle to prevent movement of the inner receptacle relative thereto.

It is a still further object of the invention to so construct the receptacles that a single cover will serve for both.

With the above and other objects in view, reference is had to the accompanying drawings in which—

Figure 1:
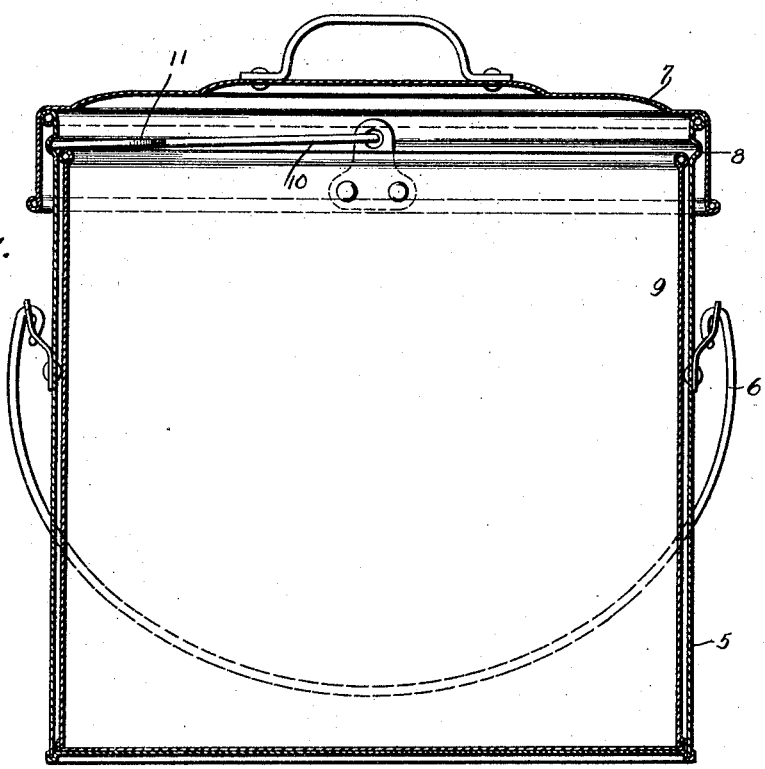
Figure 1 is a vertical sectional view of a device constructed in accordance with the present invention.

Referring more particularly to the drawings, the reference character 5 designates the outer receptacle, and said outer receptacle is in the form of a bucket or pail to which is pivotally secured a bail or handle 6. This outer receptacle is provided with a cover 7 adapted to close the open end thereof as more clearly shown in Fig. 1. The outer receptacle 5 is formed near its upper edge with a channel or annular groove 8 formed in the side wall thereof, the purpose of which will be hereinafter more fully described.

The reference character 9 designates the inner receptacle and said inner receptacle is provided with a bail or handle 10 formed with a manipulating member 11 intermediate of its ends, said manipulating member 11 projecting inwardly of the bail. This manipulating member 11 is formed by bending the bail to form a loop, and said loop is adapted to project inwardly of the receptacle when the bail is in the folded position.

Figure 2:
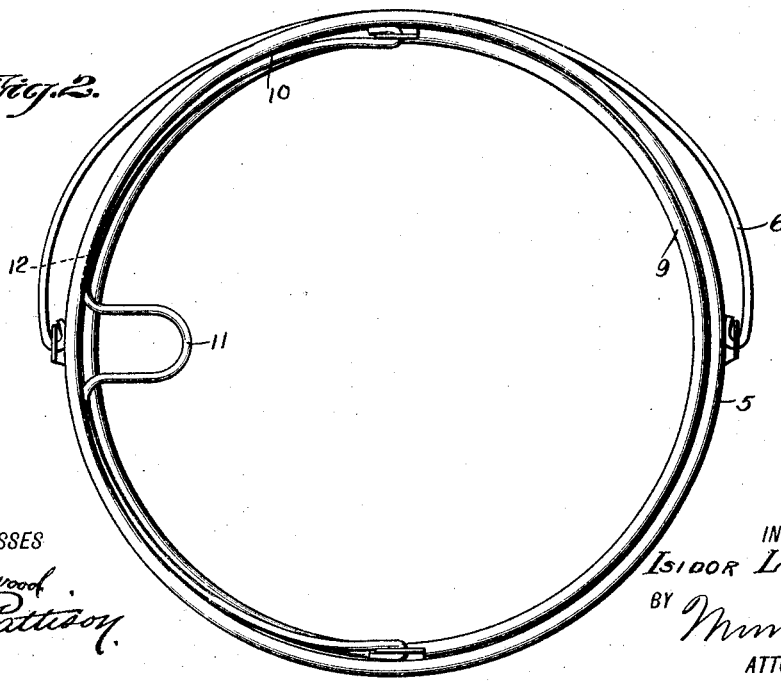
Fig. 2 is a top plan view thereof with the cover removed.

The operation of the device is as follows: When the inner receptacle 9 is inserted within the outer receptacle 5, the bail 10 of the inner receptacle is forced into the annular groove or channel 8 as indicated by the reference character 12 in Fig. 2. In order to spring the bail 10 into the annular channel or groove 8, the inner receptacle 9 will be moved with respect to the outer receptacle until the side wall of the inner receptacle opposite to that side upon which the bail 10 is swung, will bend with respect to the outer receptacle and thus the inner receptacle will be held stationary with respect to the outer receptacle and said inner receptacle will not be permitted to rattle within the outer receptacle.

When it is desired to remove the inner receptacle, the manipulating member 11 is simply grasped and elevated and owing to the resiliency of the bail the same will become disengaged with respect to the groove 8 to permit of the removal of the inner receptacle 9 as a whole.

I claim:

A garbage can comprising an outer receptacle formed adjacent its open end with an annular groove, a second receptacle adapted to be inserted within the first-mentioned receptacle, said second receptacle being of smaller size than said first receptacle, a bail pivotally carried by said second receptacle, said bail being adapted to engage within the groove of the first-mentioned receptacle to retain the second-mentioned receptacle within the first-mentioned receptacle, and a handle formed intermediate the ends of said bail, said handle projecting inwardly of the inner receptacle and providing means for operating the bail to disengage it from the annular groove to permit of removal of the inner receptacle.

ISIDOR LEVY.